Sept. 20, 1949.  E. A. NOELCKE  2,482,716

SNAG PULLER AND TACKLE SAVER

Filed Aug. 27, 1948

E. A. Noelcke
INVENTOR

BY CASnow&Co.
ATTORNEYS.

Patented Sept. 20, 1949

2,482,716

UNITED STATES PATENT OFFICE 2,482,716

SNAG PULLER AND TACKLE SAVER

Edward A. Noelcke, St. Petersburg, Fla.

Application August 27, 1948, Serial No. 46,535

1 Claim. (Cl. 43—30)

This invention relates to a device for retrieving a snagged fishing line.

An important object of the invention is to provide a device of the character described that will be quite efficient in use, easily readied for use and easily operated, and that will be capable of manufacture at low cost.

Another important object of the invention is to provide a device of the character stated which will embody means for preventing a line on which the device is used, from catching in the device in a manner to prevent efficient use of the puller.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 3:
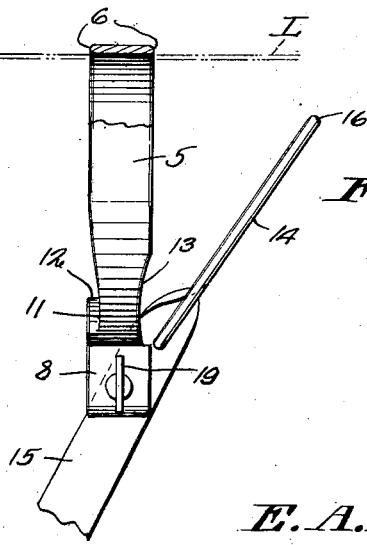
Figure 3 is a view partly in side elevation and partly in section.

Referring to the drawings in detail, the reference numeral 5 designates a clamping ring of any suitable material having the desired characteristics of strength and at least a certain amount of resiliency. Ring 5 is of the split ring type, and it may be noted that the circumferential opposed edges 6 of the ring are rounded off as best seen from Fig. 3, so as to eliminate the possibility of a fishing line L being cut when the device is used thereon.

As mentioned, ring 5 is split, and is integrally formed with spaced radially extended ears 7 and 8, that have aligned openings 9 and 10, opening 9 being smooth walled and opening 10 being threaded.

Figure 2:
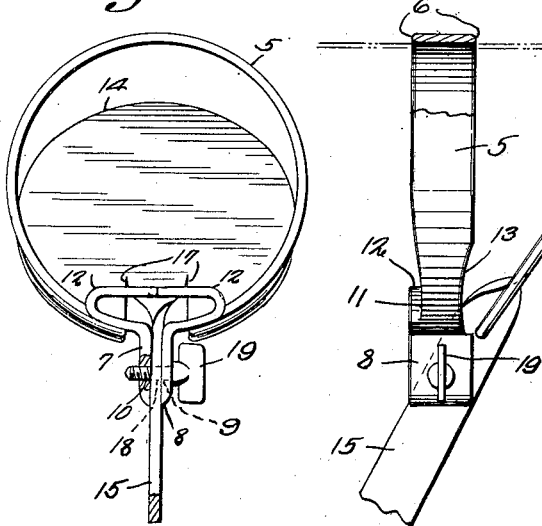
Figure 2 is a face view of the device, a portion of the handle being broken away.

Adjacent the ears 7 and 8, angular cuts 11 are formed in the ring, and these define guard fingers 12. Guard fingers 12 as shown in Fig. 2, are formed with return bends immediate their ends, so that the free ends of the fingers extend toward each other. Normally, the free ends of the guard fingers are spaced slightly apart, however, when the ears 7 and 8 are tightened toward each other around a clamp handle to be described, the space between the free ends of the guard fingers is closed.

The opposite edge of the clamping ring 5, disposed opposite the fingers 12, is cut away slightly as at 13, to provide a clearance for a clamping disc 14 that is pivotally mounted relative to the ring 5. Clamping disc 14 is formed, preferably integrally, with an elongated handle or lever 15. Additionally, the peripheral edge 16 of the clamping disc is rounded off, again for the purpose of preventing a fishing line L from being cut thereby.

Figure 1:
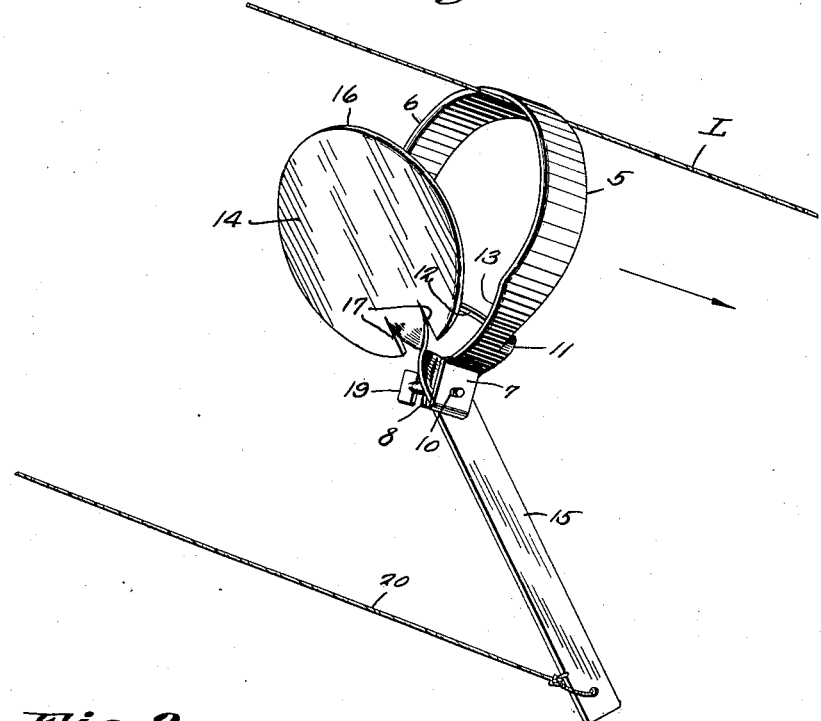
Figure 1 is a perspective view of a snag puller and tackle saver device constructed in accordance with the invention, the device being illustrated as it appears when slid along a fishing line that has been snagged.

As readily seen from Fig. 1, spaced splits or cuts 17 are formed in the clamping disc, as continuations of the side edges of the lever 15, and this permits the disc 14 to be bent through 90° relative to the lever 15, so that the plane of the lever and the plane of the clamping disc are perpendicular to each other. Additionally, as best seen from Fig. 3, the clamping disc 14 is slightly inclined relative to a line drawn longitudinally and centrally through the lever 15.

Formed in the lever 15, adjacent its inner end, is a smooth walled opening 18, and this opening is adapted to be brought into register with the openings 9 and 10. Thus, a thumb screw 19 is positioned through all the openings, and is adapted to be threaded in the opening 10, whereupon the ears 7 and 8 are clamped with sufficient tightness to the lever 15. The ears are not clamped to the lever so tightly, however, as to prevent the pivoting of the lever on the thumb screw 19.

To the other end of the lever 15 is connected a flexible pull cord 20, which can be of string or the like.

The device in operation normally is not applied to a fishing line L. However, assume that the fishing line L becomes snagged on some underwater obstruction such as a rock, and cannot be removed in any ordinary manner. Then, with the clamping ring 5 separated from the clamping disc 14, the device is applied to the fishing line L adjacent the pole (not shown). This is accomplished simply by inserting the line L through the space between the ears 7 and 8, which space will of course be clear since the parts will have been disassembled.

When the line has been inserted through said space, the parts are assembled as shown in the drawing.

The entire device is now permitted to slide along the line L into the water toward the snag, as indicated by the direction arrow in Fig. 1. As the device slides along the line, the flexible element 20 is paid out as necessary.

When the device has reached the limit of its travel, and is adjacent the snagged portion of the fishing line, the user simply pulls upon the cord 20, and this clamps the fishing line L between the disc 14 and the clamping ring 5.

As to how the line L will be retrieved, this will depend on the particular snag. In some cases the ring 5 will move all the way along the line L until it actually clamps against the hook. Continued pull on the cord 20, in this instance, often tends to straighten the hook out or turn the snag over to free the line. Or, at least the line L might be clamped close to the hook, and then, if the snag is not turned over or the hook straightened, the line L is broken directly against the snag, thus saving considerable yardage of valuable fishing line.

In use, it may be noted that the guard fingers 12 will, when the ring 5 is secured to the lever 15, be brought against each other so as to close the space normally provided therebetween. As a result, line L cannot move past the guard fingers 12, and thus the line cannot get caught in the pivotal connection of the lever to the clamping ring, or in other portions of the device, since the line will be carried in a fully enclosed ring. The cut away portion 13, meanwhile, provides clearance for the heel portions of the clamping disc 14, so that when pull is exerted upon the pull cord 20, the clamping disc is enabled to move into the clamping ring 5 for the purpose of engaging the line L securely against movement relative to the device.

What is claimed is:

A device of the class described comprising a clamping ring, said clamping ring being split, ears extending from the clamping ring, guard fingers formed on the clamping ring on opposite sides of the split therein, a clamping disc adapted to be swung into the ring to clamp a fishing line therebetween, an operating lever integral with and extending from the clamping disc, pivot means for the operating lever extending through the ears and said lever, said guard fingers adapted to be moved toward each other into engagement to close the ring to prevent a fishing line extended therethrough from moving out of the ring, and a flexible element secured to the operating lever.

EDWARD A. NOELCKE.

REFERENCES CITED

The following references are of record in the file of this patent:

UNITED STATES PATENTS

| Number | Name | Date |
|---|---|---|
| 1,042,630 | Wetmore | Oct. 29, 1912 |

FOREIGN PATENTS

| Number | Country | Date |
|---|---|---|
| 9,352 | Sweden | Nov. 5, 1898 |